March 24, 1931.  F. DUSTAN  1,797,944
TOOL HOLDER
Filed June 18, 1928  2 Sheets-Sheet 1

March 24, 1931. F. DUSTAN 1,797,944
TOOL HOLDER
Filed June 18, 1928 2 Sheets-Sheet 2

Patented Mar. 24, 1931

1,797,944

UNITED STATES PATENT OFFICE

FRANK DUSTAN, OF FITCHBURG, MASSACHUSETTS, ASSIGNOR TO SHAW-CRANE-PUTNAM MACHINE COMPANY, INC., OF FITCHBURG, MASSACHUSETTS, A CORPORATION OF DELAWARE

TOOL HOLDER

Application filed June 18, 1928. Serial No. 286,109.

This invention relates to a tool holder capable of general use but particularly adapted for use with a conical ingot peeling machine in which the holder rotates on its own axis while an ingot is passed through it in an axial direction to have its surface peeled.

Among the objects of the invention are to provide a self-contained tool holder assembly; to provide a construction in which the thrust is taken against the shoulder and the hub of the operating gear; and to provide means for steadying the gear which operates the tool holder on the inner face of the main housing with a hardened steel ring and track.

In its preferred form the invention involves the provision of means for feeding tools in toward the work radially as the work passes through the same for the purpose of peeling the surface from a conical ingot and taking practically the same cut throughout its length. This involves means for turning the cutter supporting member with respect to the rotation of the entire tool holder and for feeding the tools forward thereby, that is, toward or from the center, and also means by which the tools can be returned simultaneously to their original position when the machine is stopped.

The invention is shown as applied to a tool holder for turning conical ingots with means for feeding the knives inwardly and moving them outwardly again.

Reference is to be had to the accompanying drawings in which—

Fig. 3 is an end view of one of the tool slides, and

Fig. 4 is a side view of a fastening dowel.

Figure 1:
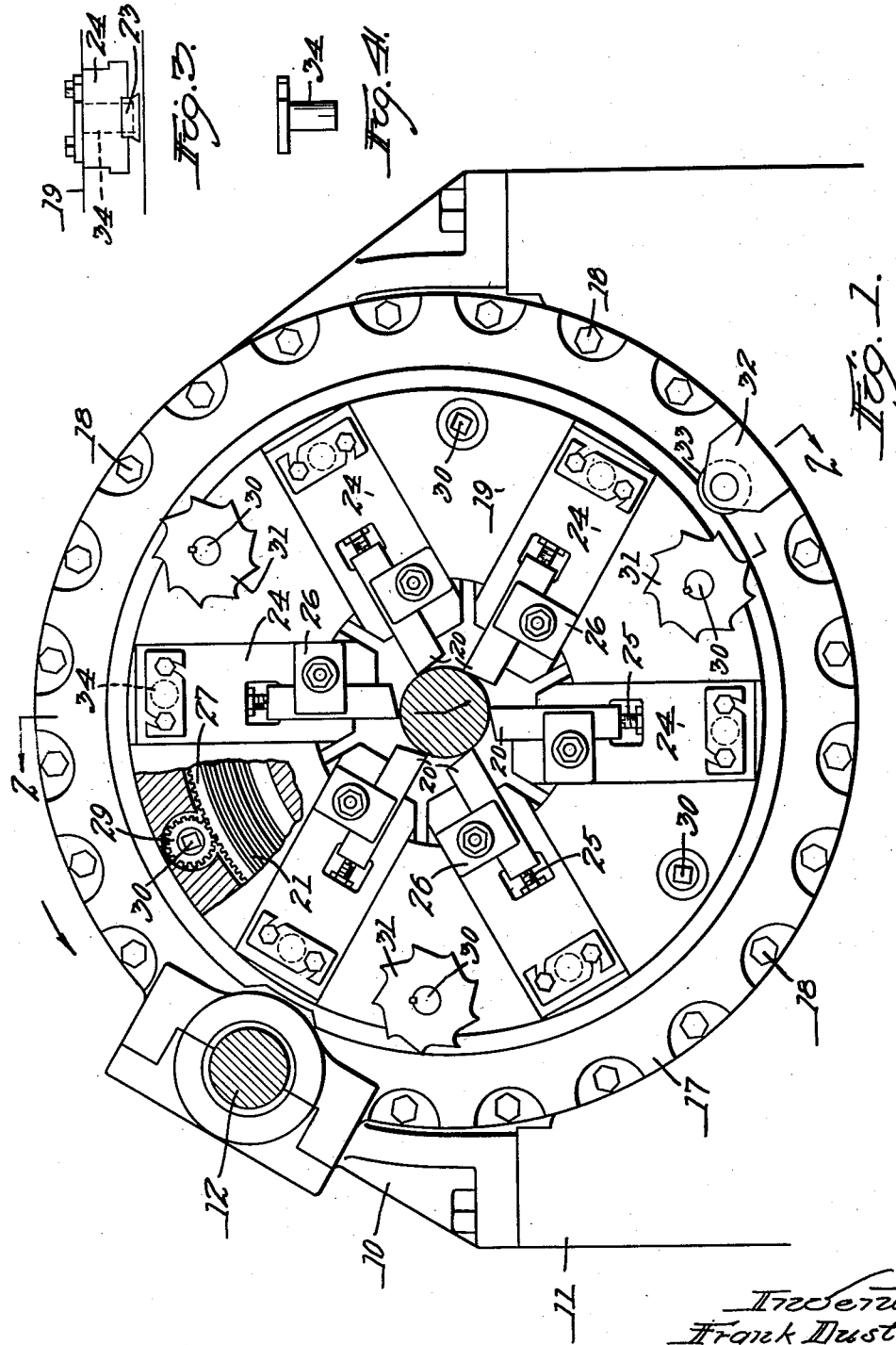
Fig. 1 is a front view of a tool holder constructed in accordance with this invention, with certain parts in section and showing the interior.
Figure 2:
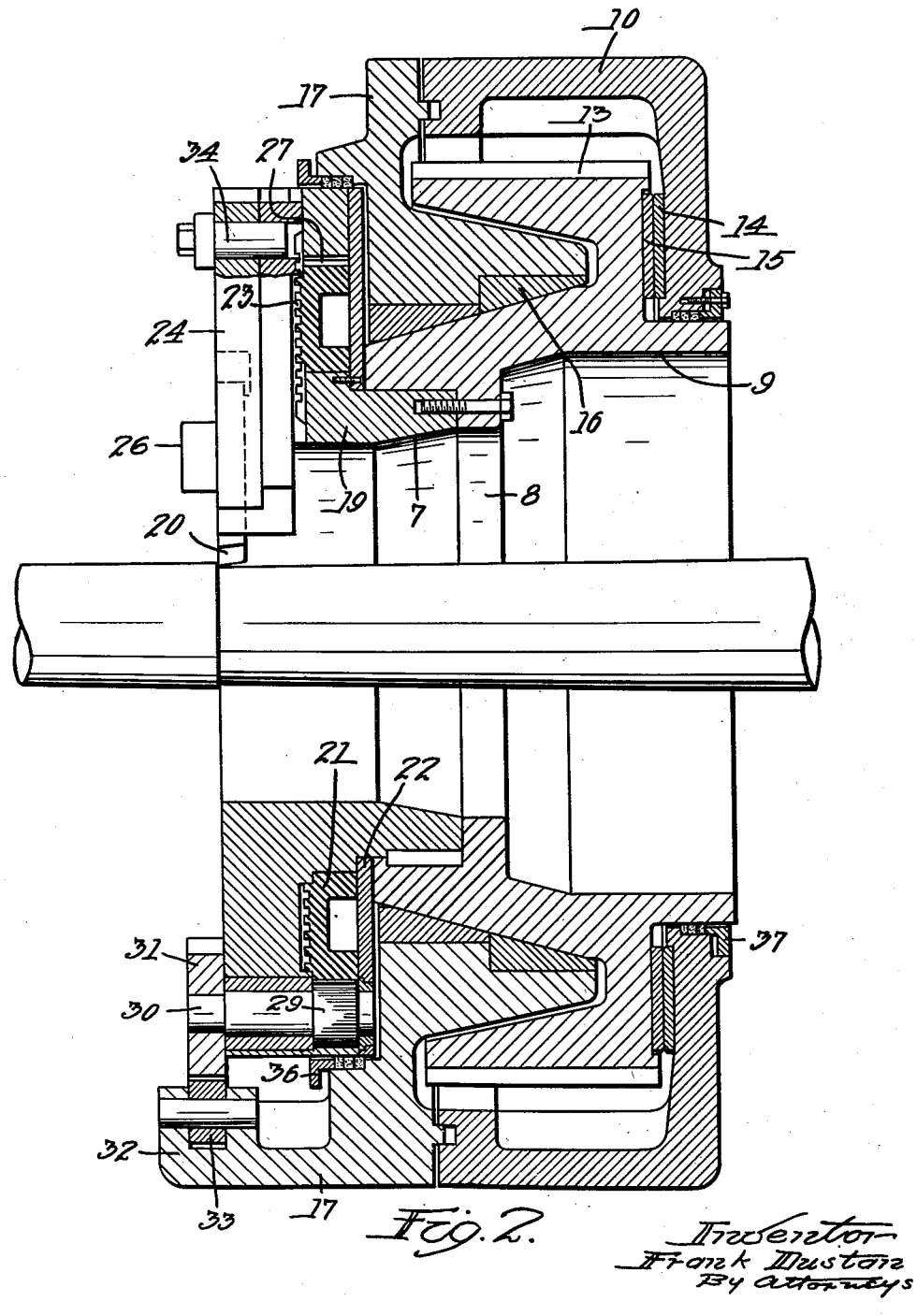
Fig. 2 is a sectional view on the line 2—2 of Fig. 1.

It may be stated in the first place that this cutter is designed for use in a conical ingot peeling machine in which the ingots are moved centrally through an axial passage through the cutter and the rotating cutters are designed merely to peel the surface off the ingot. Ordinarily this operation is employed for cylindrical billets but when used for conical ingots an additional feature has to be employed, namely means for feeding the tools inwardly as the ingot advances, to preserve the conical shape of the ingot.

The device is shown as comprising the casing or cutter head 10 which is fixed in stationary position on a bed 11. The bed supports a driving shaft 12 which, by means of a pinion drives a gear 13 inside the casing and power is transmitted from this gear. To this gear is fixed the tool holder.

The gear 13 is provided with a recess 9 in one end, having a conical surface at its inner end, and this is provided with a continuation 8 of a cylindrical form. The tool holder 19 is also provided with a conical recess 7 which communicates with the recess 8. The object of this conical or bell mouthed construction is to provide ample chip clearance between the ingot and the interior of the tool holder when the larger sizes of ingots are being peeled.

The casing is provided with a large annular bronze track 14 on its inner face for receiving the end thrust. The gear 13 is provided with a hardened steel ring 15 fastened to its right hand face which runs on the track 14. The gear runs on a large bronze lined tapered bearing 16 contained on the inner face of the front or adjusting plate 17 which really constitutes a part of the casing 10. This plate 17 is secured to the casing 10 by bolts 18. Adjustment is obtained by spreading washers on the bolts securing the cover plate 17 to the main casing. The tool holder 19 is set into the hub of the gear 13 and bolted to it. On the tool holder are mounted the cutters 20.

In order to peel conical ingots, the tool holder 19 is shown as provided with a recess in which is located an annular scroll gear 21 bearing against a plate 22 bolted to the tool holder. The scroll 21 is capable of rotation in the recess in which it is located. It meshes with a series of racks 23 on a series of slides 24 arranged radially. Obviously, the rotation of the scroll gear 21 relative to the tool holder 19 moves these slides out or in. These slides 24 carry the respective tools 20 and are held in position in radial recesses. Each tool 20 is backed up by a screw 25 and is provided with a clamp plate 26 which is forced down on the tool to hold it in adjusted position.

The racks 23 are held to the tool slides 24 by means of dowels 34 having T-shaped heads oppositely slotted to receive two bolts. The head can be turned to release the dowels from the bolts and then the dowels withdrawn. This releases the tool slides so that they can be replaced by those of different lengths, according to the diameter of the ingot to be peeled. This provision is made in order that the overhang of the tools 20 may be held to a minimum and the maximum bearing of the slides 24 be maintained.

For retaining the lubricant within the tool holder and preventing the entrance of cutting compound, two stuffing boxes 36 and 37 and glands are placed on opposite sides of the tool holder.

The scroll gear 21 is provided with a gear 27 around its circumference or in other words gear teeth are cut in the circumference of the scroll. At six points around the circumference are pinions 29 mounted on shafts 30, three of which have square ends, whereby a hand or power driven wrench or spanner can be applied when the slide is stationary to turn the scroll and move the tools for adjustment or to draw them back to original position after they have operated through a complete cycle. On each of the other three shafts 30 is keyed a star wheel 31 and on the stationary plate 17 is located a plate or projection 32 having a roll 33 or other means for engaging these star wheels each time one comes past it and turning the star wheel a certain part of a revolution defined by the number of teeth on the wheel.

It will be seen that, in the form shown, three times during the revolution of the cutter the scroll will be turned a short distance by the operation of the roll 33 and the three star wheels. This causes the scroll to feed the cutters simultaneously by step-by-step motion. This can be arranged to feed them in or out, but in the present instance it is shown as feeding them in for operating on a conical ingot in which the large end goes in ahead. Then, when the cutter head is stopped, a wrench can be put on one of the shafts 30 and the scroll 21 restored to its original position.

The tools are individually adjusted by screws 25 to compensate for the sharpening to which they have to be subjected. The tools are of sufficient length to allow for considerable amount of grinding before they become too short for use.

The gear is well supported in conical bearings on the casing 10 or its cover and the track 14 is provided for taking the thrust in that direction. The feeding of the tools for use for peeling conical ingots is an additional feature used in that type of machine and the way of controlling that feed and restoring the scroll to its original position is very convenient.

Although I have illustrated and described only one form of the invention I am aware of the fact that modifications can be made therein by any person skilled in the art without departing from the scope of the invention as expressed in the claims. Therefore, I do not wish to be limited in these respects but what I do claim is:—

1. In a tool holder, the combination with a tool holding element, of a scroll gear of annular form mounted concentrically with respect thereto and capable of an independent rotary motion, a set of cutting tools mounted in radial position on the tool holding element, a radial rack connected with each tool and meshing with the scroll gear, whereby the rotation of the scroll will feed all of the tools radially and means operated by the rotation of the tool holding element for rotating the scroll gear at a different speed.

2. In a tool holder, the combination with a rotary tool holding element having an annular concentric recess, of a scroll gear rotatable in said recess, a series of radially movable cutters projecting toward the center of the tool holder, means connected with said cutters for engaging the scroll and operating the cutters when the scroll turns relatively to the tool holding element, a gear cut on the edge of the scroll gear, a series of pinions meshing with the gear and means whereby certain of said pinions can be turned when the tool holder is not in operation to restore the cutters to original position.

3. In a tool holder, the combination with a rotary tool holding element, of an annular scroll gear carried thereby frictionally, a spur gear on the edge of the scroll gear, a series of pinions meshing with the spur gear each having a stud, certain of said studs having star wheels rotating with the tool holding element, and stationary means located in the path of the teeth of said star wheels for rotating them as they pass it and feeding the tools.

4. In a tool holder, the combination with a rotary tool holding element, of an annular scroll gear carried thereby frictionally, a spur gear cut on the edge of the scroll gear, a series of pinions meshing with the spur gear each having a stud, certain of said studs having star wheels rotating with the tool holding element, stationary means located in the path of the teeth of said star wheels for rotating them as they pass it and feeding the tools and means whereby certain of said pinions can be turned when the tool holder is not in operation to restore the cutters to original position.

5. In a tool holder, the combination with a gear and means for rotating it, of a tool holder secured to the gear to rotate therewith, a series of tools mounted radially on the tool holder, means for adjusting said tools radially individually, said gear and tool holder each having a central passage therethrough, through which the work can be passed, and means for feeding the tools automatically and intermittently by the rotation of the tool holder.

6. In a cutter head, the combination with a stationary casing and an adjustable plate carried thereby, of a gear located in said casing and having a passage through it for the work, means for operating said gear, said gear having a conical hub having a bearing on the adjustable plate axially, means for adjusting the plate with respect to the casing to tighten up the bearing, a tool holder fixed to said gear and having a passage through it for the work and located outside the plate and a series of tools arranged radially on the tool holder and projecting into the passage therethrough.

7. In a cutter head, the combination with a plate and a stationary casing, of a gear located in the casing, a tool holder fixed to the gear and having a series of tools arranged radially on its face, a bearing between the gear and the plate, an annular bronze track fixed to the inside face of the casing and a bearing ring fixed on the edge of the gear to engage said track for transmitting the end thrust to the casing.

8. In a tool holder, the combination with a rotary body, of tool slides radially arranged thereon, a rack arranged along each tool slide, a headed dowel connecting each slide with its rack, means for detachably holding the dowel so that it can be removed thus releasing the slide so as to allow it to be replaced with one of different length, and means engaging the rack for feeding the tool slide radially.

9. In a cutter head, the combination with a plate and a stationary casing, of a gear located in the casing, a tool holder fixed to the gear and having a series of tools arranged radially on its face, a bearing between the gear and the plate, an annular bronze track fixed to the inside face of the casing, a bearing ring fixed on the edge of the gear to engage said track for transmitting the end thrust to the casing, and stuffing boxes between the casing and gear and between tool holder and plate to retain oil and prevent the admission of cutting compound.

In testimony whereof I have hereunto affixed my signature.

FRANK DUSTAN.